Feb. 25, 1958 A. D. BAKER 2,824,427
VEHICULAR AIR CONDITIONING SYSTEM
Filed Sept. 23, 1954 5 Sheets-Sheet 1
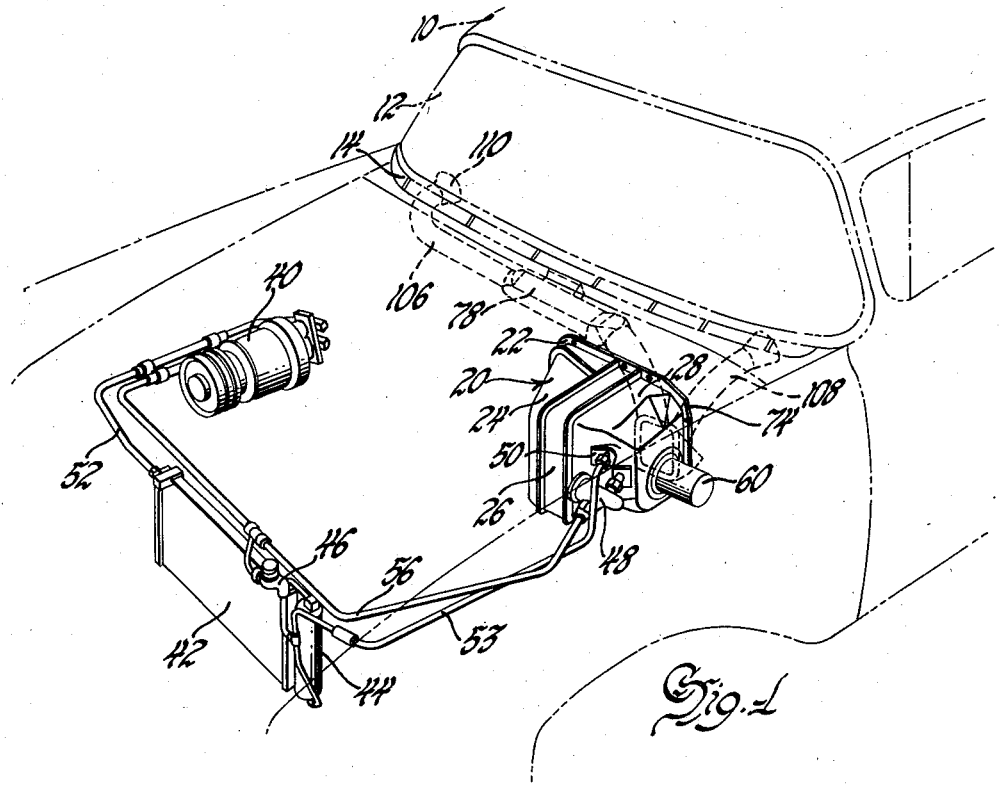
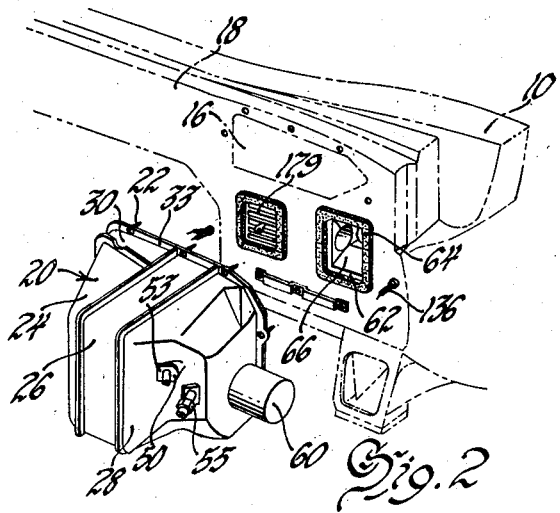
INVENTOR
Albert D. Baker
BY
ATTORNEY Feb. 25, 1958  A. D. BAKER  2,824,427
VEHICULAR AIR CONDITIONING SYSTEM
Filed Sept. 23, 1954  5 Sheets-Sheet 2
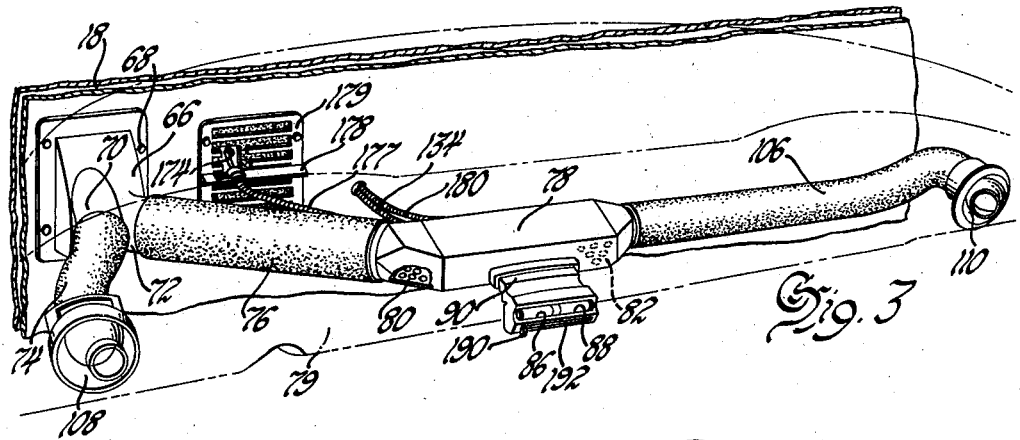
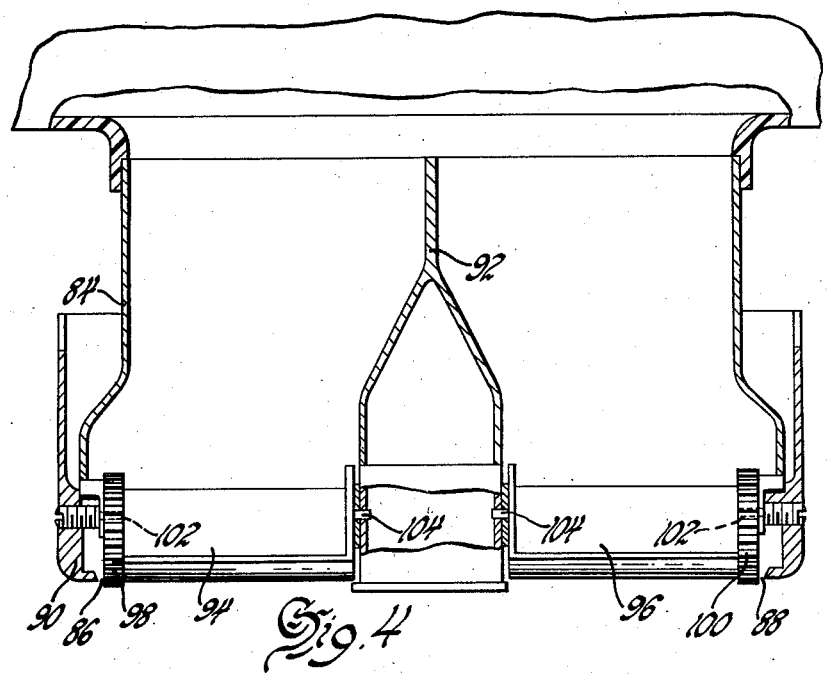
INVENTOR
Albert D. Baker
BY
ATTORNEY Feb. 25, 1958 — A. D. BAKER — 2,824,427
VEHICULAR AIR CONDITIONING SYSTEM
Filed Sept. 23, 1954 — 5 Sheets-Sheet 3
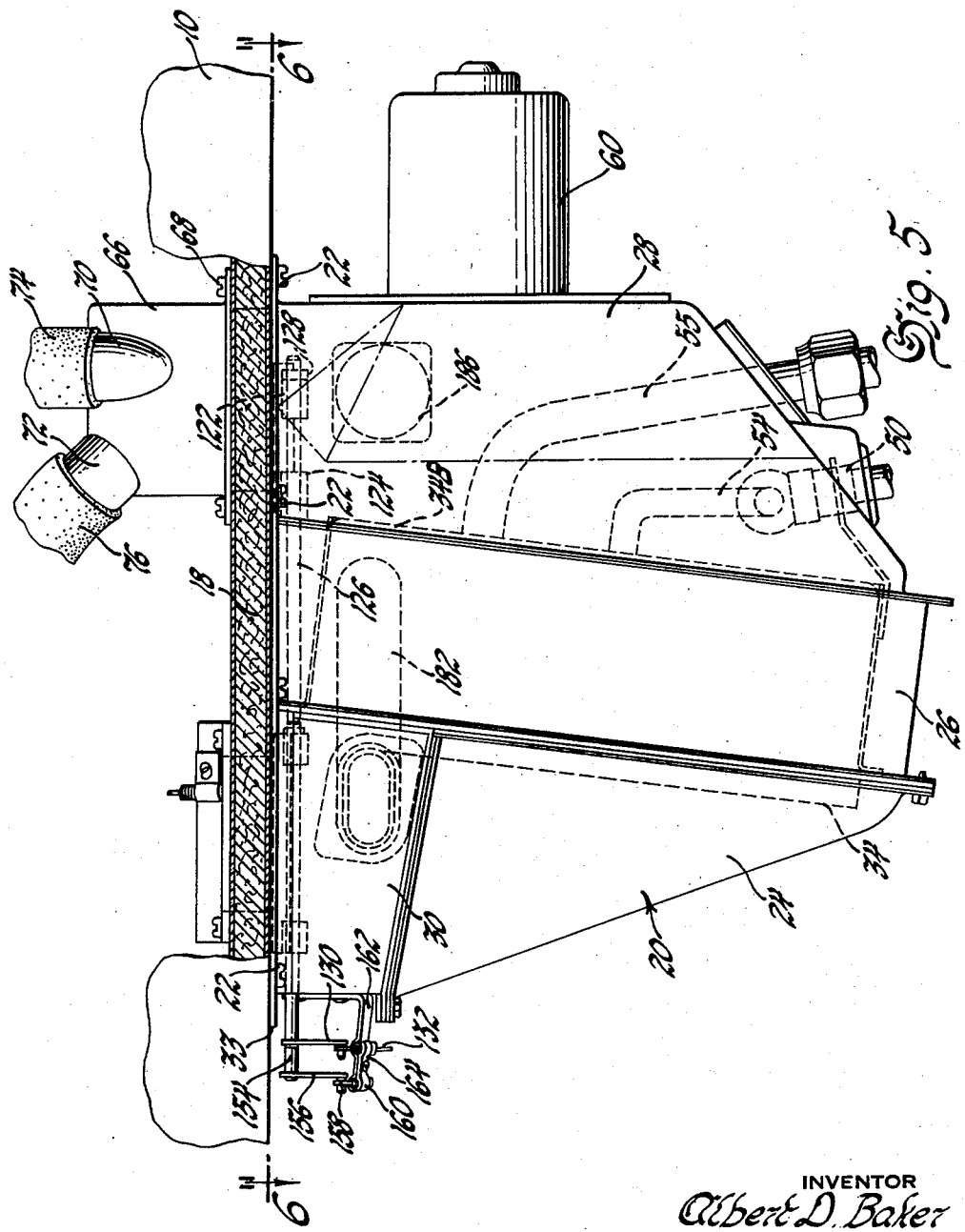
INVENTOR
Albert D. Baker
BY
ATTORNEY

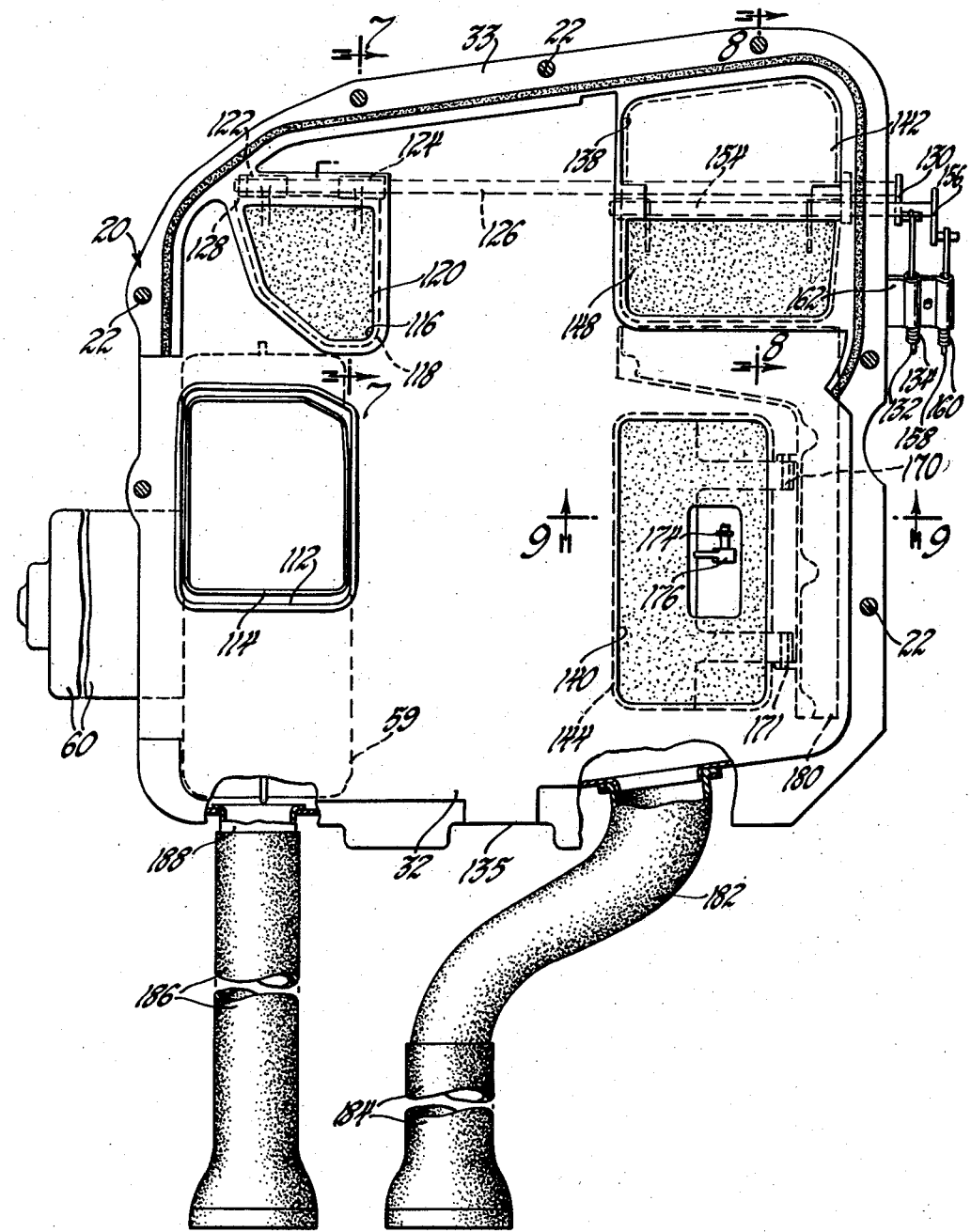

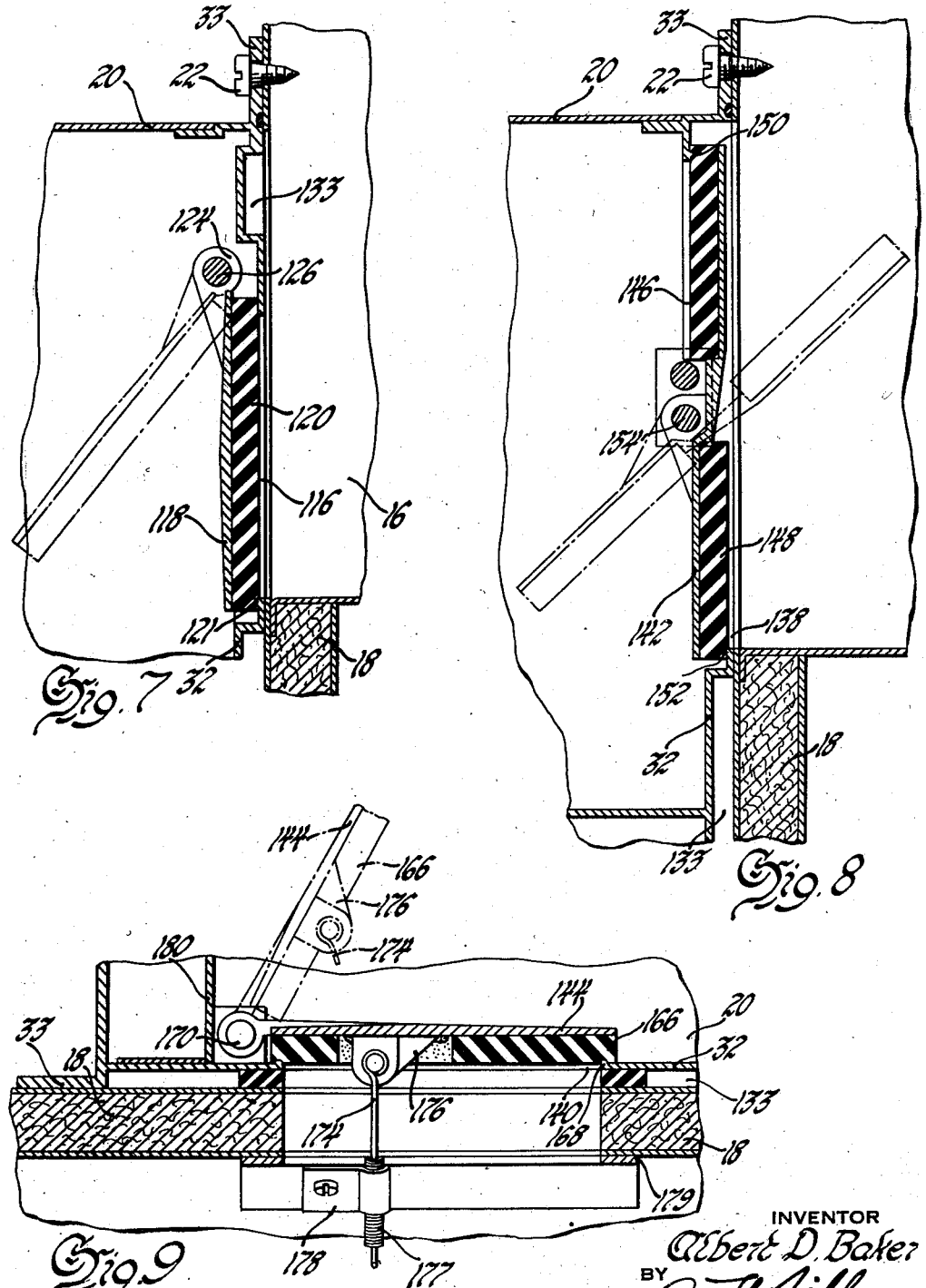

United States Patent Office 2,824,427
Patented Feb. 25, 1958

2,824,427

VEHICULAR AIR CONDITIONING SYSTEM

Albert Daniel Baker, Lansing, Mich., assignor to General Motors Corporation, Detroit, Mich., a corporation of Delaware Application September 23, 1954, Serial No. 457,856

4 Claims. (Cl. 62—117)

This invention relates to air conditioning systems and more particularly to such systems as are suitable for installation in automotive vehicles.

In prior attempts to apply air conditioning to automobiles, difficulties have arisen in combining a multiple air valve arrangement, an evaporator core and an elevated outside air intake in such a way that compactness of the air conditioning system is achieved together with realization of effective and convenient control of air flow and temperature.

An object of the present invention is to provide an improved air conditioning system for a vehicle or automotive body by means of which the above-mentioned difficulties are avoided and in which outside air is directed forwardly through a fire wall, subjected to contact with a heat exchanger such as an evaporator core, and then directed into the passenger compartment of the vehicle.

Another object is to provide an air conditioning system for an automobile in which valves are compactly arranged as a group and by means of which air utilized in the system may be taken from outside the vehicle or from the vehicle passenger compartment.

A feature of the invention is a heat exchange core located forwardly of the fire wall within a casing and associated with means for directing air forwardly through the fire wall and into contact with the core and then rearwardly into the passenger compartment.

Another feature is a heat exchange core in a casing arranged for mounting forwardly of a vehicle fire wall, the casing being adapted to conduct air controlled by three valves compactly arranged in substantially the same plane for selectively admitting outside air to either side of the core and recirculating air to one side of the core.

The invention will now be more particularly described by reference to the accompanying drawings and thereafter pointed out in the claims.

In the drawings:

Fig. 1 is a perspective and phantom view of a portion of an automobile with an air conditioning system installed therein and embodying the present invention;

Fig. 2 is an exploded and perspective view of some elements shown in Fig. 1;

Fig. 3 is a perspective view of the air conditioning system associated with and located on the passenger compartment side of the fire wall of an automobile and as related to the instrument panel;

Fig. 4 is an enlarged and sectional view of a nozzle arrangement shown in Fig. 3;

Fig. 5 is a plan view of the evaporator casing shown in Fig. 1 and a portion of the fire wall serving as a mounting for the casing being shown in section;

Fig. 6 is a sectional view taken along the line 6—6 of Fig. 5 and showing the rear wall of the evaporator casing;

Fig. 7 is an enlarged and sectional view along the line 7—7 of Fig. 6;

Fig. 8 is an enlarged and sectional view taken along the line 8—8 of Fig. 6; and Fig. 9 is an enlarged and sectional view taken along the line 9—9 of Fig. 6.

A suitable vehicular body for which the system herein described may be provided is fully disclosed in the application for United States Letters Patent S. N. 392,806, filed November 18, 1953, in the names of James D. Leslie, Robert M. Fox and Lloyd E. Muller and entitled "Vehicle Body With Built-in Ventilation System."

Fig. 1 discloses a portion of an automobile body 10 having a windshield 12 and an elongated cowl air inlet 14 extending along the length and base of the windshield. As in application S. N. 392,806, above referred to, air admitted through the elongated inlet 14 is forced to pass downwardly and then forwardly through an opening 16 (Fig. 2) formed in the left-hand upper portion of the fire wall 18.

The problem confronted by applicant was to distribute and control this air properly with appropriate use of an evaporator core so that the passenger compartment of the vehicle would be suitably air conditioned under widely varying conditions. To this end, an evaporator core casing generally designated at 20 and made up of a number of flanged sections bolted together is arranged to be supported on the engine compartment side of the fire wall 18 by means of fastenings 22. The main sections of the evaporator casing 20 are sections 24, 26 and 28 which are joined by means of abutting flanges. A fourth and smaller section 30 is interposed between the section 24 and a rear wall 32 (Fig. 9) which is arranged parallel with the fire wall 18. The wall 32 has a rearwardly offset peripheral flange 33 through which the fastenings 22 extend. The casing section 26 is rectangular in configuration and so proportioned as to suitably support and contain a cooling core 34 (Fig. 5). It will be seen that the width of this core extends away from the fire wall and is at a slight angle with a plane perpendicular to the fire wall 18. This angular positioning is not a requisite but is conducive to securing a smoother flow of air.

As the present invention does not involve all the features of the air conditioning system, only the main features of the overall system are shown in Fig. 1 and they are described herein sufficiently to explain the operation of the system. Fig. 1 shows a compressor 40 for a refrigerant medium, a condenser 42 conveniently located at the front of the vehicle, a liquid receiver 44, a relief valve 46, a pressure regulator valve 48 and an expansion valve 50. It will be understood that refrigerant compressed at 40 will pass through a line 52 to the coils of the condenser 42 and then by means of a line 53 to the expansion valve 50 and thence by means of a line 54 (Fig. 5) to the core 34. After passing through the core 34, the refrigerant is passed by a line 55 to the pressure regulator valve 48 and from thence by means of a line 56 back to the compressor 40. As is well understood in the art, refrigerant passed through the expansion valve 50 into the core 34 absorbs heat from air which may pass through the latter and is at least partially vaporized by reduction of pressure. The compressor 40 takes this partially or all vaporized refrigerant and compresses it to liquid form and the condenser 42 removes heat from this liquid so that the latter again may be circulated through the cycle.

Enclosed within the evaporator casing section 28 is a blower 59 (Fig. 6) which is adapted to be driven by a motor 60 extending from the casing. The inlet to the blower is in communication with one side 34B of the core 34. The outlet of the blower is in communication with an opening 62 (Fig. 2) formed in the fire wall 18. A sealing gasket 64 is arranged between the wall 18 and the wall 32 of the casing 20.

On the passenger compartment side of the wall 18 is a flanged manifold 66 which is attached by means of fastenings 68 to the fire wall and which registers with the opening 62. This manifold is provided with two outlet connections 70 and 72 which in turn are in communication with the ends of flexible tubes 74 and 76, respectively.

The opposite end of the conduit 76 is connected to a plastic manifold 78 which is located between the instrument panel 79 and the fire wall 18. This manifold is provided with two groups of perforations 80 and 82 directed downwardly toward the floor of the passenger compartment. Manually operated slide valves are provided for these groups of openings but are not shown in the drawings. An intermediate portion of the manifold 78 is provided with a rearwardly extending duct 84 (Fig. 4) which communicates with openings 86 and 88 formed in a casing 90 mounted on the instrument panel. The duct 84 is divided by a wall portion 92 so that two valve members 94 and 96 may be suitably supported. Each of these valve members is shaped in the form of a half-cylinder and is provided with a knurled disc 98 or 100 by means of which the valve may be rotated from or to closed position. One end of the valve 94 is supported on a pivot pin 102 and the other end is supported on a pivot pin 104. The valve 96 is similarly supported. One end of the plastic manifold 78 is connected to one end of a flexible conduit 106. The rearwardly extending ends of the flexible conduits 74 and 106 are connected to air discharge nozzles 108 and 110, respectively. These nozzles are mounted on opposite ends of the instrument panel and may be adjusted as to angular discharge of air into the passenger compartment. These nozzles may take various forms without departing from the spirit of the present invention and a suitable nozzle for this function is described in the Patent 1,559,057 granted October 27, 1925, in the name of A. W. Stewart.

The rear wall 32 of the evaporator casing 20 is provided with four openings, one opening 112 (Fig. 6) being arranged to accommodate the outlet 114 of the blower. Above the opening 112 is a smaller opening 116 which communicates with one end of the opening 16 in the fire wall. This opening is controlled by a somewhat triangular-shaped valve member 118 to which is fixed a rubber-like pad 120 adapted to seat on the margin or offset lip 121 (Fig. 7) of the plate 32 surrounding the opening. The valve 118 is provided with bracket members 122 and 124 fixed to a horizontal shaft 126. One end of the shaft 126 is supported in a bearing member 128 fixed to the plate or wall 32. The other end of the shaft 126 extends outwardly from the casing 20 and bears a crank 130 to which is pivotally connected a Bowden wire 132. This wire is guided by a flexible conduit 134. The wire 132 is adapted to be longitudinally operated by a knob conveniently located on the instrument panel but not disclosed in the drawings. Water is prevented from running down the wall 18 into the space 133 defined by the wall 32 by a sealing material placed between marginal portions of the latter and the wall 18. Any moisture which may gather is drained out through an opening 135 (Fig. 6) leading through the flange 33.

The blower is controlled by a three-speed switch also located on the instrumental panel. The blower motor 60 and the switch are connected by wiring 136.

In the right-hand half of the wall 32 are located an upper opening 138 and a lower opening 140. These openings are controlled by valves 142 and 144, respectively.

Valve 142 is in the form of a butterfly valve and opposite sides thereof are faced with a resilient material in the form of pads 146 and 148 which are adapted to seat on lips 150 and 152 formed on the wall 32. The valve is fixed to a shaft 154 journaled in the casing 20 and an exposed end of the shaft bears a crank 156 which is pivotally connected to a Bowden wire 158. This wire leads to a knob on the instrument panel 79 and is guided by a flexible conduit 160. The ends of the conduits next to the casing 20 are supported by a bracket 162 and a cooperating bracket plate 164.

Valve 144 bears a rubbery facing 166 which is adapted to seat on a lip 168 formed on the wall 32. Vertical pins 170 and 171 support the valve with relation to the opening 140. A Bowden wire 174 is pivoted to the valve 144 through an ear 176 and this wire extends through a flexible conduit 177 to the instrument panel 79. A clamp 178 is used to anchor one end of the conduit to an ornamental grille 179 covering the opening in the fire wall.

An L-shaped trough 180 is fixed to the wall 132 to guide water around the opening 140. Water flowing therefrom is permitted to flow out from the casing by way of a conduit 182 and a pinched one-way flexible tube 184. A second one-way tube 186 is connected to the casing 20 by means of a short tube 188 to drain moisture from the casing at the left side of the core 34.

Associated with the casing 90 on the instrument panel 79 is a slidable lever 190 which is movable horizontally in a slot 192. A two-circuit switch for controlling the blower motor 60 is associated with this lever. The same is true regarding suitable linkages for controlling the Bowden wires 132, 158 and 174. A suitable arrangement for this lever with its associated switch and linkages is disclosed in the application S. N. 399,014, filed December 18, 1953, in the names of John R. Holmes, Lawrence A. Zwicker, and Robert R. Mandy and entitled "Air Conditioning System," now U. S. Patent No. 2,787,888. These specific controls do not form a part of the present invention and are, therefore, not described in detail herein.

In operation of the present system air entering in the cowl inlet slot 14 just beneath the windshield molding passes into the cowl and then forwardly through the opening 16 (Fig. 2) in the fire wall and from which the air enters the casing 20 either by way of the valve 142 or the valve 118 depending upon the positions of the latter. If the lever 190 is placed in its left-hand position within the slot 192 as viewed in Fig. 3, then the arrangement of the valves is such that the evaporator by-pass valve 118 alone is open or in its dot-and-dash line position, as viewed in Fig. 7, to admit outside air for distribution to the passenger compartment by way of the nozzles 108 and 110 as well as the plastic manifold 78. This admission of air is without benefit of the blower 59 and is due to ram effect as the vehicle moves. Upon movement of the lever 190 a slight distance to the right as viewed in Fig. 3, the valve 118 continues to admit air but the blower 59 is started by action of the lever on the switch and no refrigeration effect is given to the air admitted to the passenger compartment. Movement of the lever 190 a further distance to the right causes the compressor 40 to be started by activation of suitable contacts on the blower motor switch and outside air admitted through the by-pass valve 118 contacts merely the left side of the evaporator core 32. As the air does not pass through the core, only a slight cooling effect is had insofar as conditioning the air is concerned. Upon further movement of the lever 190 to the right, there is a gradual transition in which the by-pass valve 118 gradually closes and the outside air inlet valve 142 begins to open. This causes part of the air from the inlet 14 to pass through the core 34 to give a more definite cooling effect. A further stage enters in by extending the movement of the lever 190 to the right and in this event, the by-pass valve 118 becomes fully closed and the air inlet valve 142 starts to close. Simultaneously with this action, the recirculation valve 144 begins to open thereby causing air from the passenger compartment to be recirculated through the core 34.

The arrangement is such that when the greatest cooling effect is had and with the lever at its extreme right position, approximately twenty percent of the air is taken through the outside air valve 142 and eighty percent through the recirculation valve 144. This prevents fogging of the windows under some conditions and assures an adequate supply of outside air for the passengers.

From the above it may be seen that the arrangement is compact and simple and permits adjustment of conditions in which outside uncooled air being admitted may be gradually changed to air subjected to the greatest refrigeration effect.

I claim:

1. A vehicular air conditioning system for a body having a cowl air inlet, a fire wall, a passenger compartment and a passage leading forwardly from said inlet to the rearward side of said fire wall, said system comprising an evaporator casing mounted on the forward side of said fire wall and adapted to communicate with said passage, a cooling core in said casing, an outside air inlet valve arranged to direct air from said passage to one side of said core, a by-pass valve arranged to direct air from said passage to the other side of said core opposite said one side, a recirculating valve arranged beneath said inlet valve and adapted to direct air from said passenger compartment to said one side of said core, a blower having its inlet in communication with said casing at said other side of said core, and means for conducting air from said blower to said passenger compartment.

2. A vehicular air conditioning system for a body having a cowl air inlet, a fire wall, a passenger compartment and a passage leading forwardly from said inlet to said fire wall, said system comprising an evaporator casing mounted on the forward side of said fire wall and communicating with said passage, a cooling core in said casing, an outside air inlet valve arranged to direct air from said passage to one side of said core, a by-pass valve arranged to direct air from said passage to the side of said core opposite said one side, the said core sides being in air flow series, a recirculating valve arranged to direct air from said passenger compartment to said one side of said core, a blower within said casing and having its inlet in direct communication with said side of said core opposite said one side, said valves being arranged in substantially the same plane, spaced nozzles communicating with said passenger compartment, means for guiding air from the outlet of said blower to said nozzles, and controls for said valves arranged to be operated from said passenger compartment.

3. An air conditioning system for an automotive body having a fire wall forward of a passenger compartment, said system comprising a heat exchange core in a casing adapted for mounting forwardly of said fire wall, said casing having three ports and valves arranged in association therewith and in substantially the same plane, two of said valves being adapted to admit outside air to opposite sides of the said core and the third of said valves being adapted to admit recirculating air to one side of said core, and means for guiding air from said core and casing and adapted to direct air to said passenger compartment.

4. An air conditioning system for an automotive body having a fire wall forward of a passenger compartment, said system comprising a heat exchange core in a casing adapted for mounting forwardly of said fire wall, three valves mounted on said casing and adapted to be associated with openings in said fire wall, one of said valves being adapted to guide outside air to one side of said core, another of said valves being arranged to guide outside air to the side of said core opposite said one side, the third of said valves being arranged to guide air from said passenger compartment to said one side of said core, a blower with an inlet communicating with the said side of said core opposite said one side, and means connected to the outlet of said blower and adapted for guiding air from said core and casing to said passenger compartment.

References Cited in the file of this patent

UNITED STATES PATENTS

| | | |
|---|---|---|
| 2,187,982 | Moncrief | Jan. 23, 1940 |
| 2,295,750 | Norris et al. | Sept. 15, 1942 |
| 2,475,897 | Iwanski | July 12, 1949 |
| 2,532,486 | Fairbanks et al. | Dec. 5, 1950 |
| 2,631,517 | Duhn | Mar. 17, 1953 |
| 2,789,794 | Moore | Apr. 23, 1957 |